July 7, 1942.  J. S. MACHIR  2,288,910
POTATO DIGGER
Filed May 10, 1941    3 Sheets-Sheet 1

Joseph S. Machir
INVENTOR

BY Victor J. Evans & Co.
ATTORNEYS

July 7, 1942.  J. S. MACHIR  2,288,910
POTATO DIGGER
Filed May 10, 1941  3 Sheets-Sheet 2
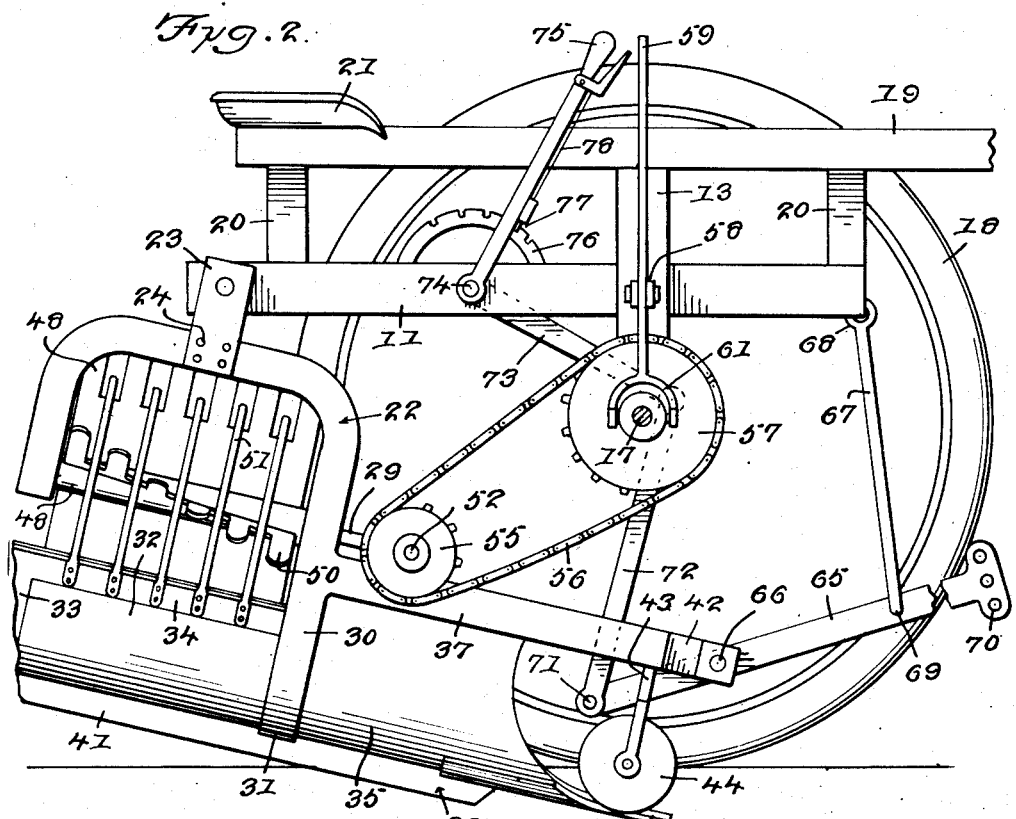
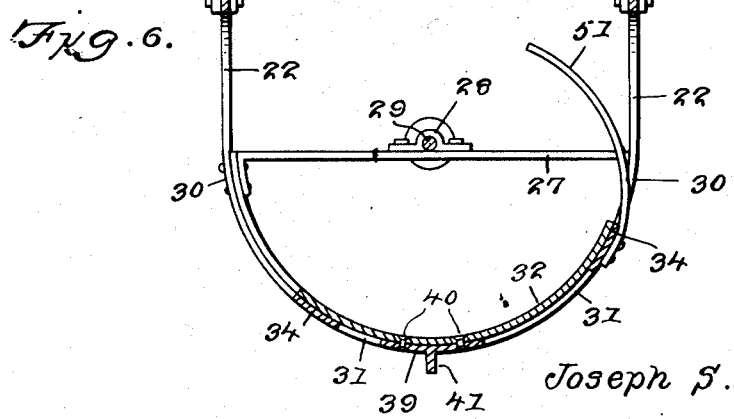
Joseph S. Machir
INVENTOR
BY Victor J. Evans & Co.
ATTORNEYS July 7, 1942.    J. S. MACHIR    2,288,910
POTATO DIGGER
Filed May 10, 1941    3 Sheets-Sheet 3

Joseph S. Machir INVENTOR
BY Victor J. Evans & Co.
ATTORNEYS

Patented July 7, 1942

2,288,910

UNITED STATES PATENT OFFICE 2,288,910

POTATO DIGGER

Joseph S. Machir, Kansas City, Kans.; Stella M. Machir, administratrix of said Joseph S. Machir, deceased Application May 10, 1941, Serial No. 392,971

3 Claims. (Cl. 55—58)

This invention relates to potato diggers and has for an object to provide a simplified potato digger having a digging plow formed of a front concave section terminating in a ground penetrating point, a rear concave section extending in alignment with the bottom of the front section but of less height than the front section and constituting the bottom of a threshing chamber, and a blade extending the entire length of the bottom of the front section and of the rear section and adapted to run in the ground and steady the plow.

A further object is to provide a potato digger having the plow and threshing chamber formed as a unit pivotally suspended at the rear end from the rear of the frame of the potato digger and adjustably suspended at the front end from the frame of the potato digger so that it may be raised from the horizontal above the ground for transportation, and may be lowered at the front end to dig underneath the potatoes and advance in a row and lift the same out of the ground when the potato digger is drawn forwardly astride of the row of plants.

A further object is to provide a potato digger having a threshing fan provided with three vanes slit to form fingers adapted to pass between curved stripping arms when the fan is rotated to be cleared of vines, the fan ejecting the vines at one side of the machine and the potatoes at the opposite side of the machine during progress of the machine along the row of plants.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 2 is a view in elevation of the opposite side of the potato digger, but showing the plow in operative position.

Figure 6 is a cross sectional view taken on the line 6—6 of Figure 1.

Figure 3:
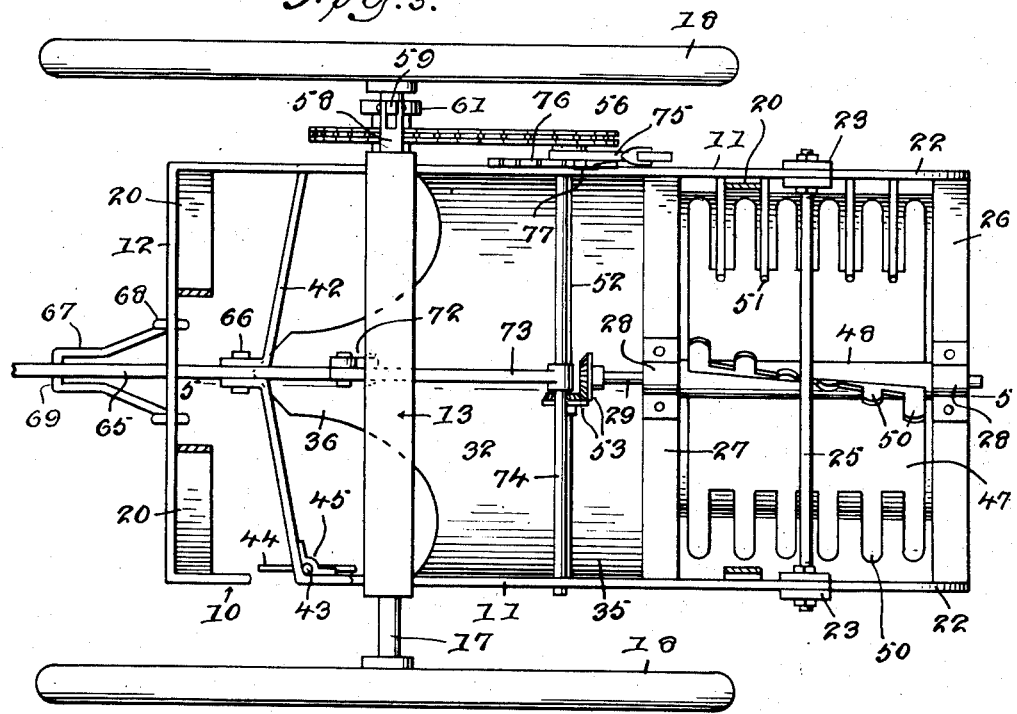
Figure 3 is a plan view of the potato digger.
Figure 4:
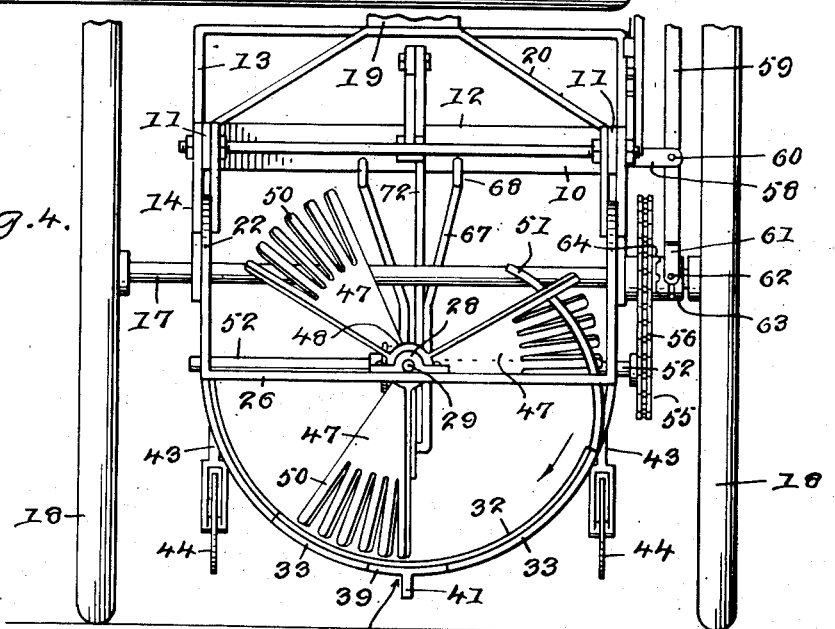
Figure 4 is a rear elevation of the potato digger.

Referring now to the drawings in which like characters of reference designate similar parts in the various views, the potato digger is shown to comprise a horizontally disposed U-shaped supporting frame 10 including side bars 11 and a transverse front bar 12, best shown in Figures 3 and 4. An arched wheel supporting frame 13 has its side legs 14 bolted to the longitudinal side bars 11 of the U-shaped frame, as shown at 15 in Figure 1. The side legs 14 extend downwardly below the U-shaped frame and are equipped with openings 16 in which an axle 17 is journalled. The axle is equipped with ground wheels 18, best shown in Figure 4, one of which is loose on the axle and the other of which is fixed to the axle to turn the axle which thus provides power for operating the working parts of the machine, as will presently be described.

A draft tongue 19 is secured to the side bars 11 of the horizontal U-shaped frame by brackets 20 and a seat 21 is supported at the rear end of the draft tongue.

A pair of yokes 22 are suspended on the rear ends of the side bars 11 of the horizontal frame by respective links 23 which are bolted to the horizontal transverse members of the yokes, as shown at 24, and are pivotally secured at their upper ends to a shaft 25, best shown in Figure 3. The yokes 22 are connected at the lower ends of their rear arms by a transverse bar 26. The front arms of the yokes are connected by a transverse bar 27 and the bar 26 and bar 27 are provided with respective bearings 28 for a shaft 29 to which the threshing fan is attached.

The front arms 30 of the yokes 22 are bent downwardly and inwardly to form curved cradle bars 31 for supporting the front end of a semi-cylindrical metal sheet 32 which forms the bottom of the threshing chamber, as best shown in Figure 6.

The semi-circular metal sheet 32 is supported at the rear end and at the upper open side by downwardly curved cradle bars 33, best shown in Figure 4, which are integral at the upper ends with forwardly extending bars 34 to which the upper longitudinal edge portions of the sheet 32 are riveted, these bars being integral with the front depending arms 30 of the yokes 22.

A semi-circular metal sheet 35 is disposed in alignment with the metal sheet 32 and forms a plow which terminates at the front end in a point 36 for digging the potatoes as the machine is advanced along the row of potato plants. The plow 35 is secured at the upper edge portions, in any preferred manner, to horizontally disposed arms 37, which project forwardly from the yokes 22. The rear edge portion of the plow is secured to the downwardly curved yoke arms 30, in any preferred manner.

A blade 38 of substantially T-shape in cross section has its flange 39 riveted, as shown at 40, to the bottom of the plow 35 and threshing chamber bottom 32, while the web 41 of the blade extends vertically downward and is adapted to penetrate the ground. The purpose of the blade is to steady and reinforce the plow 35 and chamber bottom 32.

Figure 1:
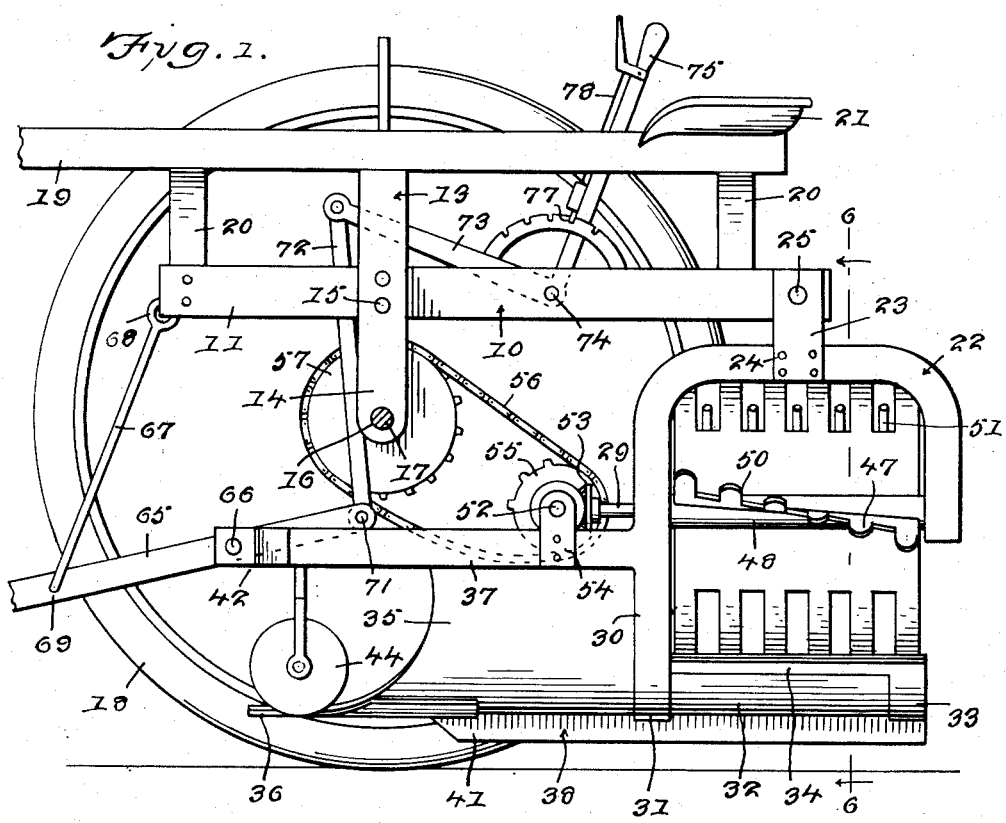
Figure 1 is a view in elevation of one side of a potato digger constructed in accordance with the invention, showing the plow raised for transportation.
Figure 5:
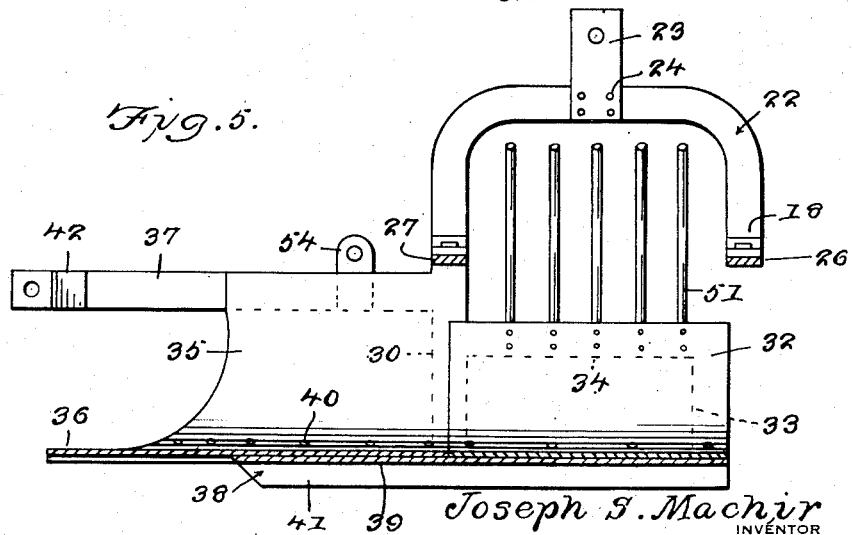
Figure 5 is a longitudinal sectional view taken on the line 5—5 of Figure 3.

By referring to Figure 1, it will be seen that the forwardly extending arms 37 to which the plow is attached are directed to the longitudinal center line of the machine, as shown at 42. The stems 43 of the cutter disks 44 are secured by strap clamps 45 in the angles formed by the arms 37 and laterally directed portions 42 thereof. These cutting disks penetrate the ground, inside of the ground wheels 18, and cut the vines close to the potatoes being dug by the point 36 of the plow as the machine is advanced along the row of potato plants.

A threshing fan 47 is provided with a hub 48 which is fixed, in any preferred manner, to the before mentioned shaft 29, the hub having formed integral therewith three blades, best shown in Figure 4, the blades being spiral in contour and extending at an angular advance of about 120° apart. The blades terminate in tines 50 which interdigitate with curved stripping arms 51 carried by the outermost bar 34 which supports the threshing chamber bottom 32, as best shown in Figure 2. As the blades rotate clockwise when viewed from the rear, as shown by the arrow in Figure 4, the blades pick up the potatoes and vines and eject the potatoes over one upper edge of the row being harvested, while the vines are carried around and stripped from the blades by the arms 51 and ejected over the top of the other side of the threshing chamber bottom 32, the latter side of the bottom being higher than the former, as best shown in Figure 6.

For rotating the threshing fan, the shaft 29 is geared at the front end to a transversely disposed shaft 52 through the medium of meshing bevel gears 53. The shaft 52 is journalled in bearing brackets 54 which extend upwardly from the arms 37 to which the upper edge portions of the plow 35 are secured.

As best shown in Figures 1, 2 and 3, one end of the shaft 52 is equipped with a sprocket gear 55 which is connected by a sprocket chain 56 to a sprocket gear 57, which is secured to the beforementioned axle 17, which is driven from one of the ground wheels.

As best shown in Figures 3 and 4, a bifurcated bracket 58 projects laterally from one of the side legs of the arched supporting frame 13. A clutch lever 59 is pivotally connected to the end of the bracket by a pivot pin 60 and the lower end of the lever is equipped with a yoke 61 having pins 62 which engage in the groove of a sliding clutch member 63 mounted on the axle 17 and adapted to engage a clutch member 64 formed integral with the gear 57 when the lever is operated to clutch the gear to the rotating axle for driving the threshing fan.

It will be pointed out that the plow 35 and threshing chamber are mounted as a unit to swing on the pivot shaft 25 which is located at the rear end of the horizontally U-shaped supporting frame 10. For swinging the plow and threshing chamber as a unit to the horizontal above the ground for transportation, and for swinging the plow and threshing chamber bottom to an inclined operative position, respectively shown in Figures 1 and 2, a short draft lever 65 is pivotally secured intermediate its ends to the front ends of the bars 42 by a pivot pin 66, best shown in Figure 3. An inverted U-shaped link 67 is provided with eyes 68 at the upper end which are pivotally received in openings in the front bar 12 of the U-shaped supporting frame 10. At the bottom of the link the bight 69 is pivotally engaged through an opening in the draft lever 65 which latter terminates in a head 70 to which a double tree may be attached if the machine is to be animal drawn. The rear end of the draft lever 65 is pivotally connected, as shown at 71 in Figure 2, to an upwardly extending link 72, the upper end of which is connected to a downwardly extending lever 73, which is rigidly secured to the center of a rock shaft 74 which extends transversely of the machine and is rotatably mounted at the ends in the side bars 11 of the U-shaped supporting frame 10. A handle lever 75 is rigidly secured to the rock shaft outside of the adjacent side bar 11 of the U-shaped frame for turning the rock shaft to raise or lower the link 72, and correspondingly raise or lower the rear end of the draft lever 65 to correspondingly raise or lower the plow and threshing chamber as a unit for transportation or for operation.

A rack 76 is secured stationary to the side bar 11 of the U-shaped supporting frame, and a pawl 77 carried by a hand operated rod 78 is engaged in the rack to hold the hand lever 75 in adjusted positions.

Since the operation of the parts has been described as the description of the parts progressed, it is thought that the invention will be fully understood without further explanation.

What is claimed is:

1. In a potato digger, a wheeled frame having horizontally disposed side bars, yokes pivotally suspended from the rear ends of the side bars, a digging plow formed of a substantially U-shaped plate terminating in a point secured to the yokes, a substantially U-shaped plate forming a threshing chamber bottom secured to the yokes in rear of and in alignment with the digging plow, a blade extending the entire length of the bottom of the plow and of the bottom of the threshing chamber bottom adapted to run in the ground and steady the plow, transversely disposed bars carried by the yokes, a shaft extending longitudinally of the wheeled frame carried by said bars, a threshing fan carried by the shaft having a plurality of blades provided with tines, curved stripping arms carried by the threshing chamber interdigitating with the tines, the blades and tines ejecting potatoes and vines from the threshing chamber when the threshing fan is rotated, motion transmitting means connected to one of the wheels of the wheeled frame and to the threshing fan for rotating the fan, and means suspending the plow at the front end from the wheeled frame for raising and lowering movement on the wheeled frame.

2. The structure as of claim 1 and in which said suspending means comprises a draft tongue pivotally connected to the forward ends of arms projecting forwardly from the yokes, a link connecting the draft tongue to the wheeled frame, a rock shaft extending transversely of the link, a hand lever for actuating the rock shaft, a lever extending from the rock shaft, and a link connecting the last named lever with the rear end of the draft tongue upon the pivot of the draft tongue.

3. The structure as of claim 1 and in which the motion transmitting means comprises a shaft extending transversely of the wheeled frame and supported at the end by arms projecting forwardly from the yokes above the plow, meshing gears connecting the threshing fan with the shaft, an axle for the wheeled frame, ground wheels on the axle, one of the ground wheels being fixed to the axle to turn the axle, a manually shiftable clutch member on the axle, a sprocket gear loose on the axle adapted to be clutched to the axle by the clutch member for rotation as a unit with the axle, and a chain drive connecting the sprocket gear with the first named shaft.

JOSEPH S. MACHIR.